United States Patent
Sogo

(10) Patent No.: US 9,389,774 B2
(45) Date of Patent: Jul. 12, 2016

(54) DISPLAY PROCESSING APPARATUS FOR PERFORMING IMAGE MAGNIFICATION BASED ON FACE DETECTION

(75) Inventor: Shinji Sogo, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 804 days.

(21) Appl. No.: 13/169,714

(22) Filed: Jun. 27, 2011

(65) Prior Publication Data

US 2012/0139950 A1 Jun. 7, 2012

Related U.S. Application Data

(60) Provisional application No. 61/418,697, filed on Dec. 1, 2010.

(51) Int. Cl.
  G09G 5/00    (2006.01)
  G06F 3/0488  (2013.01)
  G06F 3/0484  (2013.01)

(52) U.S. Cl.
  CPC .......... G06F 3/0488 (2013.01); G06F 3/04845 (2013.01); G06F 3/04847 (2013.01); G06F 2203/04806 (2013.01)

(58) Field of Classification Search
  None
  See application file for complete search history.

(56) References Cited

U.S. PATENT DOCUMENTS

| | | | | |
|---|---|---|---|---|
| 7,409,232 | B2 * | 8/2008 | Daita | 455/566 |
| 2003/0025812 | A1 * | 2/2003 | Slatter | 348/240.2 |
| 2005/0251015 | A1 * | 11/2005 | Takikawa et al. | 600/407 |
| 2006/0232611 | A1 * | 10/2006 | Brooke | 345/671 |
| 2007/0242860 | A1 * | 10/2007 | Hasebe et al. | 382/118 |
| 2008/0036793 | A1 * | 2/2008 | Wang | 345/661 |
| 2008/0148177 | A1 * | 6/2008 | Lang | G06F 3/0481 715/784 |
| 2008/0170132 | A1 * | 7/2008 | Yi et al. | 348/222.1 |
| 2008/0240563 | A1 * | 10/2008 | Takano et al. | 382/173 |
| 2008/0317339 | A1 * | 12/2008 | Steinberg | G06K 9/0061 382/167 |
| 2009/0061948 | A1 * | 3/2009 | Lee et al. | 455/566 |
| 2009/0115864 | A1 * | 5/2009 | Ogawa | 348/222.1 |
| 2009/0201261 | A1 * | 8/2009 | Day | 345/173 |
| 2009/0237421 | A1 * | 9/2009 | Kim et al. | 345/661 |
| 2010/0007763 | A1 * | 1/2010 | Yokohata | 348/222.1 |

(Continued)

FOREIGN PATENT DOCUMENTS

| CN | 1691740 A | 11/2005 |
|---|---|---|
| EP | 1 589 478 A2 | 10/2005 |

(Continued)

OTHER PUBLICATIONS

Combined Office Action and Search Report issued Jan. 6, 2014 in Chinese Patent Application No. 201110281012.2 (with English translation of category).

(Continued)

*Primary Examiner* — Anh-Tuan V Nguyen
(74) *Attorney, Agent, or Firm* — Oblon, McClelland, Maier & Neustadt, L.L.P.

(57) ABSTRACT

An image processing apparatus that displays an image at a touch panel display, detects whether a face image is included in the displayed image, sets a point of the displayed image as a center point for a magnification ratio change based on the detected face image, and controls the touch panel display to change a magnification ratio of the displayed image centered at the center point based on a touch input received at the touch panel display.

18 Claims, 11 Drawing Sheets

(56) References Cited

U.S. PATENT DOCUMENTS

| | | | |
|---|---|---|---|
| 2010/0046840 A1* | 2/2010 | Hashiguchi et al. | 382/201 |
| 2010/0142762 A1* | 6/2010 | Morita | 382/115 |
| 2010/0149114 A1* | 6/2010 | Li | G06F 3/0416 345/173 |
| 2010/0149305 A1* | 6/2010 | Catchpole et al. | 348/14.08 |
| 2010/0150450 A1* | 6/2010 | Tsuji | 382/195 |
| 2010/0189355 A1* | 7/2010 | Tanaka et al. | 382/190 |
| 2010/0271537 A1* | 10/2010 | Endoh et al. | 348/349 |
| 2010/0281374 A1* | 11/2010 | Schulz et al. | 715/723 |
| 2011/0035701 A1* | 2/2011 | Williams et al. | 715/784 |
| 2011/0058787 A1* | 3/2011 | Hamada | 386/224 |
| 2011/0074979 A1* | 3/2011 | Huang et al. | 348/240.99 |
| 2011/0096995 A1* | 4/2011 | Ito | 382/190 |
| 2011/0243397 A1* | 10/2011 | Watkins | G06F 17/30259 382/118 |
| 2013/0121584 A1* | 5/2013 | Bourdev | G06K 9/00281 382/190 |

FOREIGN PATENT DOCUMENTS

| | | |
|---|---|---|
| EP | 1 589 478 A3 | 10/2005 |
| EP | 1 850 579 A2 | 10/2007 |
| EP | 1 850 579 A3 | 10/2007 |
| JP | 2009-70374 A | 4/2009 |
| JP | 2009-187057 | 8/2009 |
| WO | WO 2010/102678 A1 | 9/2010 |
| WO | WO 2010/134275 A1 | 11/2010 |

OTHER PUBLICATIONS

Chinese Second Office Action issued Jul. 10, 2014 in Chinese Patent Application No. 201110281012.2 with English translation, 16 pages.

Extended European Search Report issued Mar. 9, 2015 in Patent Application No. 11175591.4.

Office Action issued Jan. 5, 2016 in Japanese Patent Application No. 2012-019233.

* cited by examiner

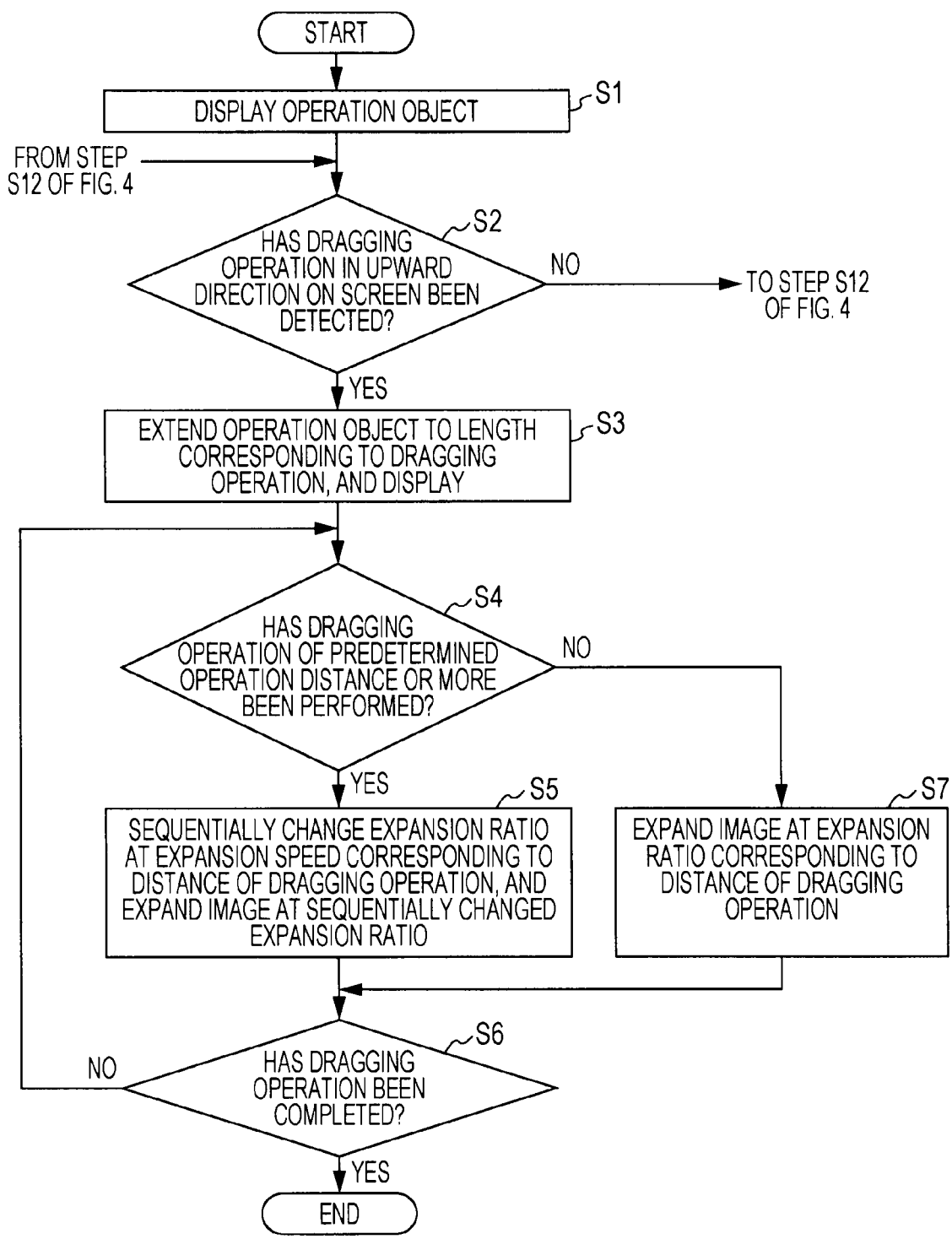

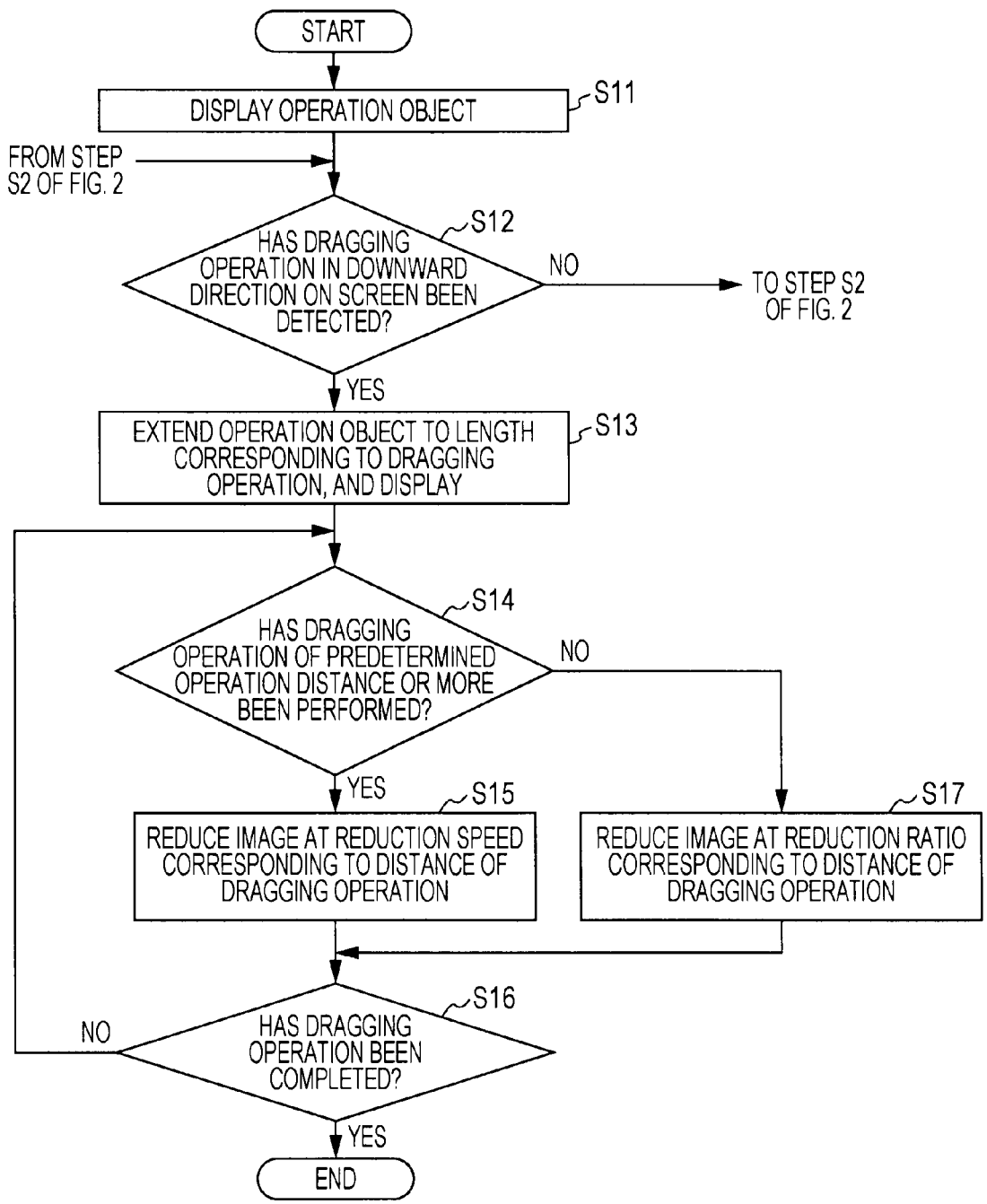

FIG. 9

| Name | Group | Attribute 1 | Attribute 2 | Priority |
|---|---|---|---|---|
| Mr./Ms. A | Sweetheart | Male | Adult | 1 |
| Mr./Ms. B | Friend | Female | Adult | 2 |
| Mr./Ms. C | Family | Female | Adult | 3 |
| Mr./Ms. D | Company | Male | Adult | 4 |
| Unregistered | — | Male | Adult | 5 |
| Unregistered | — | Female | Adult | 6 |
| Unregistered | — | Male | Child | 7 |
| Unregistered | — | Female | Child | 8 |

DISPLAY PROCESSING APPARATUS FOR PERFORMING IMAGE MAGNIFICATION BASED ON FACE DETECTION

CROSS REFERENCE TO RELATED APPLICATION

The present application claims the benefit of the earlier filing date of U.S. Provisional Patent Application Ser. No. 61/418,697 filed on Dec. 1, 2010, the entire contents of which is incorporated herein by reference.

BACKGROUND OF THE DISCLOSURE

1. Field of the Disclosure

The present disclosure relates to a display processing apparatus suitable for use with an electronic apparatus, such as, for example, a mobile phone, a personal handyphone system (PHS) set, a personal digital assistant (PDA) device, a portable game machine, a music player device, and a notebook personal computer device. In the present disclosure, when a display magnification ratio, which is an expansion ratio or a reduction ratio, is changed and a display image is displayed, the display magnification ratio is changed by setting the optimal position appropriate for the subject of the display image as the center, and the display image is displayed. As a result, the display magnification ratio of the display image is changed by using the position at which the operator is highly probable to change the display magnification ratio as the center, and the display image is displayed.

2. Description of the Related Art

Japanese Unexamined Patent Application Publication No. 2009-187057 describes a display device for performing expansion of a display area and scroll display in response to a touch-panel operation.

In the case of the display device described in Japanese Unexamined Patent Application Publication No. 2009-187057, when a display area is set to an image that is difficult to be fully displayed in the display screen, a partial image, which is an image in the display area, is displayed on a display unit. The display unit is formed as a so-called touch panel. While the finger of the operator is touch-operating the touch panel, the display device performs a process for expanding the display area. When the finger of the operator is moved away from the touch panel, the display device returns the expanded display area to the display area of the size before expansion.

In the display device, when a dragging operation of the operator is detected on the touch panel, the display area is moved in accordance with the movement direction and the movement distance of the finger of the operator in the dragging operation, and thus, the partial image is scroll-displayed.

Furthermore, an example of another related art is a mobile terminal device in which an expansion operation or a reduction operation of a display image is performed by performing a pinch operation on a touch panel.

When a pinch operation is to be performed, the operator causes his/her thumb and index finger in a contact state to be brought into contact with the touch panel. Then, the operator causes the thumb and the index finger in a contact state to be separated from each other while the fingers are in contact with the touch panel. When the mobile terminal device detects the pinch operation of gradually separating the thumb and the index finger in a contact state, the mobile terminal device performs a process for expanding the displayed image at an expansion ratio corresponding to the amount of pinch operation.

Furthermore, the operator causes the thumb and the index finger that are separated from each other to touch the touch panel. Then, the operator gradually decreases the distance between the thumb and the index finger that are separated from each other while the fingers are in contact with the touch panel. When the mobile terminal device detects the pinch operation of gradually decreasing the distance between the thumb and the index finger that are separated, the mobile terminal device performs a process for reducing the displayed image at a reduction ratio corresponding to the amount of pinch operation. Until the displayed image becomes an image of a desired size, the operator repeatedly performs one of the above-mentioned pinch operations.

SUMMARY

However, the mobile terminal device of the related art performs a process for expanding or reducing a display image by using a place at which an operator touches a touch panel as the center of a display. Alternatively, the mobile terminal device of the related art performs a process for expanding or reducing a display image by using the center of a display image as the center.

For this reason, in the mobile terminal device of the related art, an expansion process or a reduction process is often performed by setting a position different from the position intended by the operator as the center.

Furthermore, in the mobile terminal device of the related art, when a process for expanding a display image is to be performed by setting the place at which the operator touches a touch panel as the center, if the touched place is offset even a little, the magnitude of this variation gradually increases as the process for expanding the display image progresses. For this reason, the display image on which the expansion process has been performed often becomes a display image on which an expansion process is performed with the position different from a position intended by the operator being the center.

It is desirable to provide a display processing apparatus capable of changing the display magnification ratio, which is an expansion ratio or a reduction ratio, of a display image and displaying the image with the position at which the operator is highly probable to change the display magnification ratio being the center by changing the display magnification ratio and displaying the image with the optimal position appropriate for the subject of the display image being the center when a display image is to be displayed by changing the display magnification ratio.

According to an embodiment of the present disclosure, there is provided an image processing apparatus that displays an image at a touch panel display, detects whether a face image is included in the displayed image, sets a point of the displayed image as a center point for a magnification ratio change based on the detected face image, and controls the touch panel display to change a magnification ratio of the displayed image centered at the center point based on a touch input received at the touch panel display.

BRIEF DESCRIPTION OF THE DRAWINGS

FIG. 2 is a flowchart illustrating the flow of an expansion process in the mobile phone according to the first embodiment;

FIG. 4 is a flowchart illustrating the flow of a reduction process of the mobile phone according to the first embodiment;

FIG. 9 is a table illustrating an operation of determining the priority of the mobile phone according to the second embodiment;

DESCRIPTION OF THE PREFERRED EMBODIMENTS

First Embodiment

As an example, the present disclosure can be applied to a mobile phone.

Configuration of Mobile Phone

Figure 1:
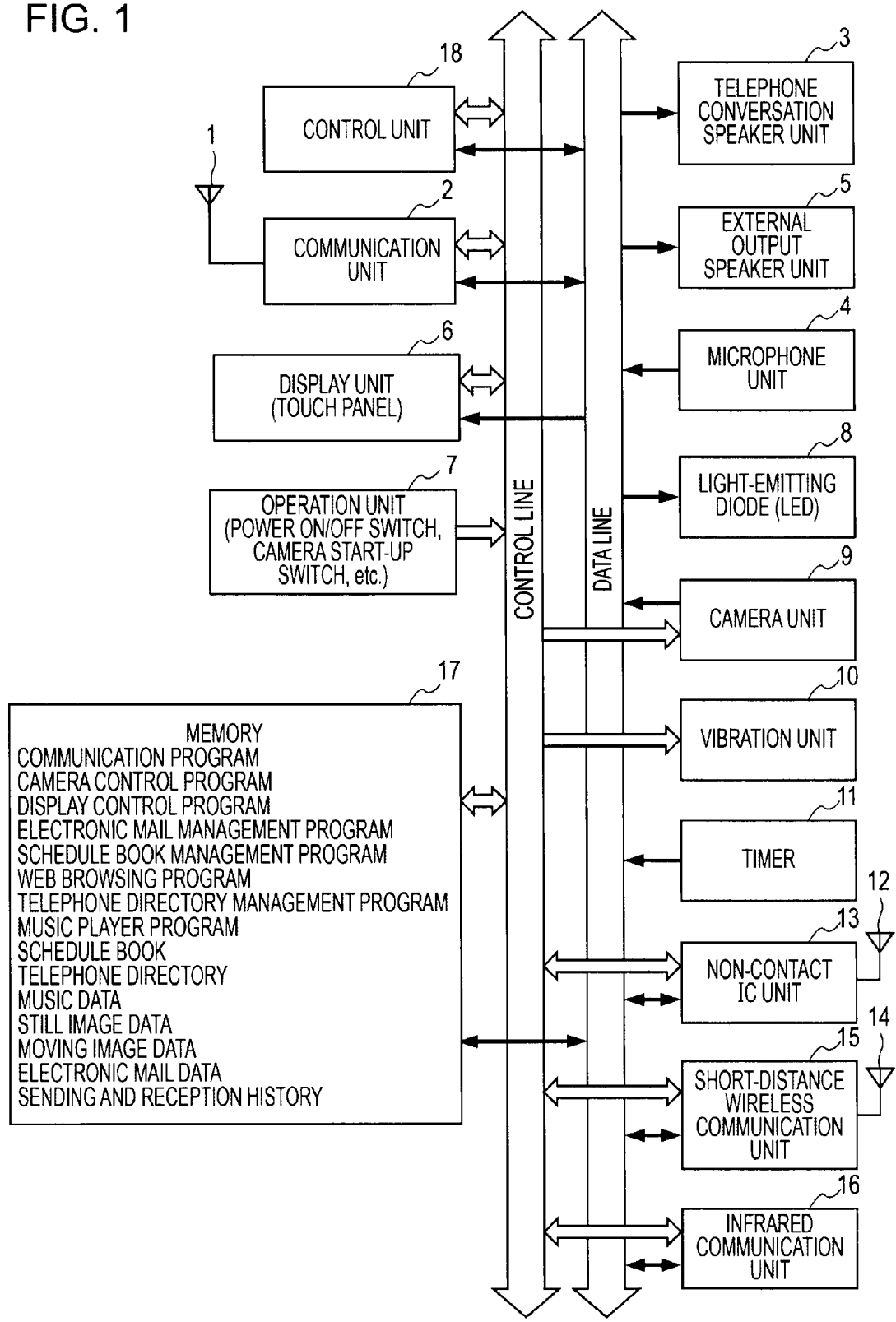
FIG. 1 is a block diagram of a mobile phone according to a first embodiment of the present disclosure.

FIG. 1 is a block diagram illustrating a schematic electrical configuration of a mobile phone according to a first embodiment of the present disclosure. As shown in FIG. 1, a mobile phone according to the first embodiment includes an antenna 1 and a communication circuit 2 for performing wireless communication, such as voice telephone conversation, television telephone call, electronic mail, or world wide web (Web) browsing, with a wireless base station.

Furthermore, the mobile phone includes a telephone conversation speaker unit 3 for obtaining voice output, such as received telephone conversation sound, a microphone unit 4 for collecting sound, such as transmitted telephone conversation sound, and an external output speaker unit 5 for obtaining voice output that is reproduced in accordance with a music player program (to be described later).

The mobile phone further includes a display unit 6 for displaying operation keys, such as numeric keys, the set key, the on-hook key, and the off-hook key, and the like, in addition to the operation menu, electronic mail, and an image (still image and moving image). The display unit 6 is formed as what is called a touch panel. On the display unit 6, for example, the operation menu, icons for starting up a desired application program, and the like are displayed. The operator touches the display position of the desired operation menu or the display position of the desired icon among the operation menus and the icons displayed on the display unit 6. The mobile phone detects the position on the display unit 6, which is touched by the operator, the operation menu or the icon specified by the operator, thereby detecting the operation menu or the icon displayed at that position. Then, the mobile phone performs information processing corresponding to the detected operation menu, or controls the start up of an application program corresponding to the detected icon.

As will be described later, when one arbitrary place on the display unit 6 is pressed as appropriate with the finger of the operator, the mobile phone shifts to a "display magnification ratio change mode", and an expansion process or a reduction process is performed on an object, such as an image or a Web page, which is displayed on the display unit 6, in response to the dragging operation of the operator.

The mobile phone has an operation unit 7 including operation keys, such as a power on/off key for switching on the main power supply of the mobile phone, and a camera start-up switch for starting up a camera unit 9.

That is, the mobile phone is provided with a software key displayed on the display unit 6 in accordance with a software program, and a hardware key that is physically provided in the housing of the mobile phone, such as a power on/off key and a camera start-up switch.

For example, when phone dialing is to be done, software keys corresponding a numeric key function, an on-hook key function, and an off-hook key function are displayed on the display unit 6. The mobile phone detects the software key that is touched by the operator from among the software keys displayed on the display unit 6. Then, the control unit 18 performs, for example, a process for inputting a telephone number, or a phone dialing process.

The mobile phone includes a light-emitting diode (LED) unit 8 for notifying the operator of sending and reception of telephone call and electronic mail, or the like by light, the camera unit 9 for capturing a still image or a moving image of a desired subject, a vibration unit 10 for vibrating the housing of the mobile phone so as to notify the operator of sending and reception or the like, and a timer 11 for counting the time.

The mobile phone further includes a non-contact wireless communication antenna 12 and a non-contact IC unit 13 for performing non-contact wireless communication in which the communication distance is, for example, approximately 20 cm, and a short-distance wireless communication antenna 14, and a short-distance wireless communication unit 15 for performing short-distance wireless communication in which the communication distance is, for example, approximately 10 m.

Furthermore, the mobile phone includes an infrared communication unit 16 for performing infrared communication, a memory 17 in which a communication program for performing a wireless communication process via the wireless base station, various application programs, and also various data that is handled by these application programs are stored, and a control unit 18 for controlling the entire operation of the mobile phone.

The memory 17 has stored therein, in addition to the communication program, a camera control program for performing the image-capturing control of the camera unit 9, and a display control program for performing the display control of still images or moving images that are captured by the camera unit 9, and still images or moving images that are obtained through a network.

The mobile phone is designed to perform an expansion process or a reduction process on an object, such as an image or a Web page, which is displayed on the display unit 6, in response to the dragging operation of the operator in the "display magnification ratio change mode" based on the display control program.

Furthermore, the memory 17 stores an electronic mail management program for controlling the creation and the transmission/reception of electronic mail, and a schedule book management program for performing the management of a schedule book in which the schedule of the operator has been registered.

Furthermore, the memory 17 stores a Web browsing program, a telephone directory management program, and a music player program. The Web browsing program browses Web pages by accessing a server device provided in a predetermined network, such as a communication network or the Internet and by transmitting and receiving information. A telephone directory management program performs the management of the telephone directory. The music player program performs the reproduction of music data.

Furthermore, the memory 17 stores a schedule book (the registration area of schedule data) in which the desired schedule of the operator is registered, and a telephone directory (the registration area of the individual information of each user) in which user names, such as acquaintances and friends of an operator, still images (face images etc.), addresses, telephone numbers, electronic mail addresses, dates of birth, and the like are registered.

Furthermore, the memory 17 stores music data that is reproduced in accordance with a music player program, still image data and moving image data that are reproduced in accordance with the display control program, electronic mail data, the sending and reception history of telephone call and electronic mail, and the like.

Operation in Display Magnification Ratio Change Mode

The mobile phone according to the first embodiment shifts to the "display magnification ratio change mode" when one arbitrary place on the display unit 6 is pressed for a predetermined time period or more with the finger of the operator, and an expansion process or a reduction process is performed on an object, such as an image or a Web page, which is displayed on the display unit 6, in response to the dragging operation of the operator.

Expansion Process

First, the flowchart of FIG. 2 illustrates the flow of a process for expanding an object in the display magnification ratio change mode.

The control unit 18 displays a predetermined object on the display unit 6, such as, for example, displaying a still image on the display unit 6 in accordance with a display control program, displaying a Web page on the display unit 6 in accordance with a Web browsing program, or displaying sent/received electronic mail on the display unit 6 in accordance with an electronic mail management program.

While the object display is being performed, when the control unit 18 detects a concentrated pressing operation at any place on the display unit 6 for a predetermined time period or more, the control unit 18 shifts to the "display magnification ratio change mode" in accordance with the display control program stored in the memory 17, and performs a process for expanding the object, which is shown in the flowchart of FIG. 2.

In other words, when any one point on the display unit 6 is long pressed for a predetermined time period or more while the object is being displayed, the control unit 18 shifts to the "display magnification ratio change mode" in accordance with the display control program stored in the memory 17, and an object expansion process illustrated in the flowchart of FIG. 2 is performed.

Figure 3A:
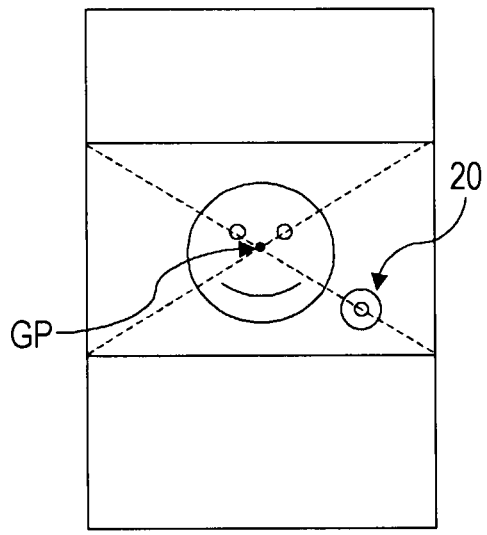
FIGS. 3A, 3B, and 3C are schematic views of an operation of an operation object of the mobile phone, and an expanded image thereof according to the first embodiment.

When the control unit 18 shifts to the display magnification ratio change mode, first, in step S1, the control unit 18 displays an operation object 20 of a predetermined diameter at the place in which the long press operation was performed by the operator within the entire display area of the display unit 6, as shown in FIG. 3A.

Although this is an example, the control unit 18 performs perform control to display the operation object 20 of a diameter corresponding to the contact area of a typical size between the finger and the display unit 6 at the time an operator presses the display unit 6 with a finger.

In FIG. 3A, the operation object 20 is illustrated in a circular shape. In addition, the operation object 20 may be any shape, such as an elliptical shape, a triangular shape, or a polygonal shape.

Next, when such an operation object 20 is displayed, the operator, while maintaining the state of touching the operation object 20, performs an upward dragging operation that is a touch operation of extending the operation object in the upward direction.

In step S2 of the flowchart of FIG. 2, the control unit 18 monitors the presence or absence of the dragging operation in the upward direction, and the process proceeds to step S3 at the time the dragging operation in the upward direction is detected.

In the case of the mobile phone of the present embodiment, when an object expansion process is specified, an upward dragging operation is performed, and when an object reduction process is specified, a downward dragging operation is performed. For this reason, when the downward dragging operation is detected in step S2, the control unit 18 proceeds the process to step S12 of the flowchart of FIG. 4, and an object reduction process is performed. The operation of the reduction process will be described later.

Figure 3B:
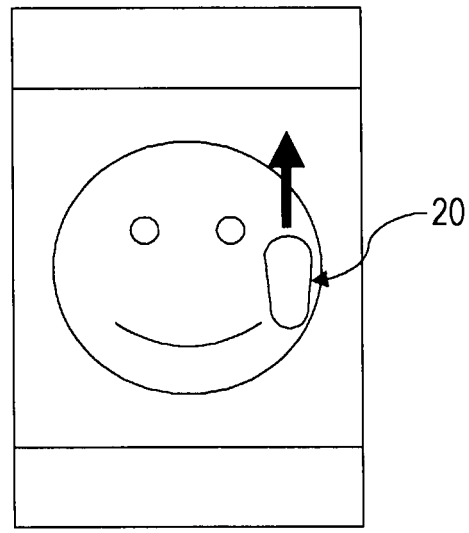

Next, when the process proceeds to step S3 in response to detecting the upward dragging operation, the control unit 18 extends the operation object to the length corresponding to the dragging operation, as shown in FIG. 3B, and performs perform control to display the operation object. In other words, while the dragging operation of the operator is being performed, in step S3, the control unit 18 performs perform control to display the operation object 20 so that the operation object is extended along the locus of the dragging operation.

Next, in step S4, the control unit 18 determines whether or not a dragging operation greater than or equal to a predetermined operation distance or more has been performed. When it is determined that a dragging operation of a predetermined operation distance or more has been performed, the process proceeds to step S5. When it is determined that a dragging operation of an operation distance shorter than the predetermined operation distance has been performed, the process proceeds to step S7.

When the process proceeds to step S7 in response to determining that the dragging operation of the operator is a dragging operation of an operation distance shorter than the predetermined operation distance, as shown in FIG. 3B, the control unit 18 performs an expansion process on the object at an expansion ratio corresponding to the dragging operation of the operator, and displays the object on the display unit 6.

That is, when the control unit 18 determines that the dragging operation of the operator is a dragging operation of an operation distance shorter than the predetermined operation distance, the control unit 18 gradually expands the object in accordance with the dragging operation of the operator and displays the object on the display unit 6.

In comparison, when the process proceeds to step S5 in response to detecting the dragging operation of a predetermined operation distance or more by the operator, the control unit 18 performs an expansion process on the object at an expansion speed corresponding to the operation distance of the dragging operation of the operator and displays the object on the display unit 6.

That is, when the control unit 18 determines that the dragging operation of the operator has reached a predetermined operation distance, the control unit 18 gradually increases the speed at which the object expands in accordance with the operation distance of the dragging operation of the operator at and following this reached distance, performs an expansion process on the object, and displays the object on the display unit 6.

Such operations of steps S5 and S7 will be described below in detail once more.

Immediately after the dragging operation of the operation object by the operator is started, the control unit 18 performs an object expansion process while gradually changing the expansion ratio to a large expansion ratio in accordance with the operation distance of the dragging operation. As a result, the object displayed on the display unit 6 is gradually (linearly) expanded in accordance with the operation distance of the dragging operation and is displayed until the operation distance becomes a specific operation distance.

Next, when the control unit 18 detects that the operation distance of the dragging operation of the operator becomes a specific operation distance or more, the control unit 18 sequentially changes the expansion ratio to a large expansion ratio at a speed corresponding to the operation distance at and following the distance. Then, the control unit 18 performs an expansion process in sequence on the object so that the object is displayed on the display unit 6 at the sequentially changed expansion ratio.

Specifically, while the operation distance of the dragging operation is 0 cm to 1 cm, the control unit 18 linearly changes the expansion ratio so as to gradually become a large expansion ratio, for example, 1.0 times (1.1 times (1.2 times (1.3 times (1.4 times (1.5 times . . . , and performs an expansion process on the object so that the changed expansion ratio is reached, and displays the object.

In comparison, when the operation distance of the dragging operation becomes longer than 1 cm, the control unit 18 sequentially changes the expansion ratio at a speed corresponding to this operation distance, and sequentially performs an expansion process on the object so that the changed expansion ratio is reached.

For example, in the case that the operation distance of the dragging operation is 2.0 cm, when it is determined in advance that the expansion ratio is changed at a double speed, the control unit 18, in a state in which the finger of the operator is stationary at this operation distance of 2.0 cm, sequentially changes the expansion ratio at a specified speed corresponding to the operation distance, for example, 2.1 times (4.2 times (8.4 times (16.8 times . . . , performs an expansion process on the object so that the changed expansion ratio is reached, and displays the object.

Similarly, in the case that the operation distance is 3.0 cm, when it is determined in advance that the expansion ratio is changed at a triple speed, the control unit 18 sequentially changes the expansion ratio, for example, 2.1 times→6.3 times→18.9 times→56.7 times . . . , and performs an expansion process on the object.

Similarly, in the case that the operation distance is 4.0 cm, when it is determined in advance that the expansion ratio is changed at four-times speed, the control unit 18 sequentially changes the expansion ratio, for example, 2.1 times→8.4 times (33.6 times (134.4 times, . . . , and performs an object expansion process.

That is, until the operation distance of the dragging operation becomes a specific operation distance, the control unit 18 performs an expansion process on the object at an expansion ratio corresponding to the operation distance of the dragging operation. For this reason, until the operation distance of the dragging operation of the operator becomes a specific operation distance, when the finger with which the dragging operation is performed is made stationary on the display unit 6, the control unit 18 stops the object expansion process (the control unit 18 stops the object expansion process while the finger of the operator is stationary) until the next dragging operation is performed after the expansion process is performed once on the object at the specific expansion ratio corresponding to the operation distance at the position at which the finger of the operator is stationary.

In comparison, when the control unit 18 detects that the operation distance of the dragging operation of the operator has reached the specific operation distance or more, the control unit 18 changes the expansion ratio at a speed corresponding to the operation distance of the dragging operation in the manner described above. For this reason, even in the state in which the finger of the operator is stationary on the display unit 6, the control unit 18 sequentially changes the expansion ratio at a speed corresponding to the operation distance of the dragging operation, for example, 2.1 times (4.2 times (8.4 times (16.8 times . . . , and sequentially performs an expansion process on the object at this changed expansion ratio.

As a result, it is possible for the operator to obtain the object that is gradually expanded through the display unit 6 until the operation object is dragged to a specific operation distance. Furthermore, from when the operation object is dragged to a specific operation distance or more until the dragging operation is completed (until the finger is moved away from the display unit 6), it is possible for the operator to obtain an object on which the expansion process is performed at the expansion ratio that is changed at a speed corresponding to the operation distance of the dragging operation through the display unit 6.

In other words, from when the operation object is dragged to a specific operation distance or more until the dragging operation is completed (until the finger is moved away from the display unit 6), even when the operator makes the finger with which the dragging operation is performed be stationary, the control unit 18 sequentially changes the expansion ratio at a speed corresponding to the position at which the finger of the operator is stationary, and sequentially performs an expansion process on the object at this changed expansion ratio.

Figure 3C:
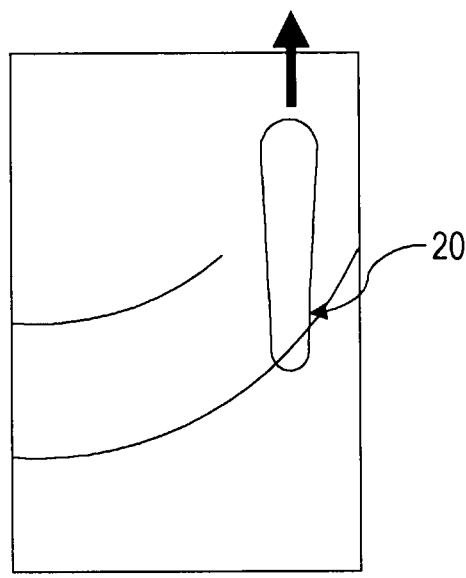

As a result, after the operation distance of the dragging operation exceeds the specific operation distance, the expansion ratio rapidly increases in spite of the fact that the operation distance is short. The object displayed on the display unit 6 is rapidly expanded as shown in FIG. 3C, and is displayed on the display unit 6.

The "specific operation distance" has been described as being set to "1.0 cm" as an example. In addition, the "specific operation distance" may be set to a length of "2.0 cm" or the "specific operation distance" may be set to a length equivalent to "300 pixels". That is, it is sufficient that the "specific operation distance" is set as desired according to design desires or the like.

Next, when such a dragging operation is to be completed, the operator moves the finger with which the dragging operation is being performed from the display unit 6. In step S6 of the flowchart of FIG. 2, the control unit 18 determines whether or not the dragging operation has been completed by determining whether the finger of the operator is separated from the display unit 6. Then, when the control unit 18 determines that the dragging operation has been completed, the process of the flowchart of FIG. 2 is completed.

When the control unit 18 determines that the dragging operation is to be continued, the process returns to step S4. When the process returns to step S4, the control unit 18 repeatedly performs the following operation in which the object is expanded and displayed at the expansion ratio corresponding to the operation distance until the operation distance of the dragging operation becomes the specific operation distance in the manner described above, and after the operation distance of the dragging operation exceeds the specific operation distance, the object is expanded and displayed while changing the expansion ratio at a speed corresponding to the operation distance.

As described above, in the mobile phone of the embodiment, when the object is to be expanded, the operator presses the display unit 6 for a long time, thereby displaying the operation object on the display unit 6. Then, the operator drags this operation object so as to be pulled up in the upward direction.

Until the operation distance of this dragging operation becomes a pre-specified operation distance, the control unit 18 of the mobile phone expands and displays the object at the expansion ratio corresponding to the operation distance.

Furthermore, when the operation distance of the dragging operation becomes the specific operation distance, the control unit 18 changes the expansion ratio at the speed corresponding to the operation distance of the dragging operation of the operator at and following the specific operation distance, and expands the object so as to become this changed expansion ratio and displays the object on the display unit 6.

As a result, by simply gripping the housing of the mobile phone with one hand, pressing the display unit 6 with the thumb of the hand that grips the housing for a long time so as to display the operation object, and dragging the operation object in the upward direction with the thumb, it is possible to expand the object displayed on the display unit 6.

Consequently, in the mobile phone, it is possible to allow the object to be expanded with two simple operations, that is, the long press operation of the display unit 6 and the dragging operation of the operation object. Furthermore, since an expansion operation is possible using one hand in the manner described above, the mobile phone has high ease of use.

Furthermore, when an object expansion process is to be performed, in the mobile phone, the object is expanded at the expansion ratio corresponding to the operation distance until the operation distance of the dragging operation becomes a specific operation distance. When the operation distance of the dragging operation becomes the specific operation distance or more, in the mobile phone, the expansion ratio is changed at the speed corresponding to the operation distance of the dragging operation of the operator at and following the specific operation distance, and expands the object so as to reach this changed expansion ratio. Consequently, after the operation distance of the dragging operation becomes the specific operation distance or more, an object expansion process is performed at an expansion ratio that is changed at a high speed, making it possible to change the expansion ratio of the object in a short time.

Reduction Process

Next, a description will be given, with reference to the flowchart of FIG. 4, of the flow of a process for reducing an object in a display magnification ratio change mode.

The control unit 18 displays a predetermined object on the display unit 6, such as, for example, displaying a still image on the display unit 6 in accordance with a display control program, displaying a Web page on the display unit 6 in accordance with a Web browsing program, or displaying sent or received electronic mail on the display unit 6 in accordance with an electronic mail management program.

While this object is being displayed, when the control unit 18 detects a concentrated pressing operation at any place on the display unit 6 for a predetermined time period or more, the control unit 18 shifts to the "display magnification ratio change mode" in accordance with the display control program stored in the memory 17, and performs a process for reducing the object, which is shown in the flowchart of FIG. 4.

In other words, when any point on the display unit 6 is long pressed for a predetermined time period or more while the object is being displayed, the control unit 18 shifts to the "display magnification ratio change mode" in accordance with the display control program stored in the memory 17, and performs an object reduction process shown in the flowchart of FIG. 4.

When the control unit 18 shifts to the "display magnification ratio change mode", first, in step S11, the control unit 18 performs control to display, for example, the operation object 20 of a predetermined diameter shown in FIG. 3A at the place at which the long press operation was performed by the operator within the entire display area on the display unit 6. While maintaining the state in which the operation object 20 is touched, the operator performs a dragging operation in the downward direction, which is a touch-operation of pulling down the operation object 20 in the downward direction.

In step S12 of the flowchart of FIG. 4, the control unit 18 monitors the presence or absence of the dragging operation in the downward direction, and at the time the control unit 18 detects the dragging operation in the downward direction, the process proceeds to step S13.

Next, when the process proceeds to step S13 in response to detecting the dragging operation in the downward direction, the control unit 18 extends the operation object to the length corresponding to the dragging operation and performs perform control to display the operation object. In other words, in step S3, the control unit 18 performs perform control to display the operation object 20 so that the operation object is extended along the locus of the dragging operation while the dragging operation of the operator is being performed.

Next, the control unit 18 determines in step S14 whether or not a dragging operation of a predetermined operation distance or more has been performed. When the control unit 18 determines that a dragging operation of a predetermined operation distance or more has been performed, the process proceeds to step S15. When the control unit 18 determines that a dragging operation of an operation distance shorter than the predetermined operation distance has been performed, the process proceeds to step S17.

When the process proceeds to step S17 in response to determining that the dragging operation of the operator is a dragging operation of an operation distance shorter than the predetermined operation distance, the control unit 18 performs a reduction process on the object at a reduction ratio corresponding to the dragging operation of the operator and displays the object on the display unit 6.

That is, when the control unit 18 determines that the dragging operation of the operator is a dragging operation of an operation distance shorter than the predetermined operation distance, the control unit 18 gradually performs a reduction process on the object in accordance with the dragging operation of the operator, and displays the object on the display unit 6.

In comparison, when the process proceeds to step S15 in response to detecting the dragging operation of the predetermined operation distance or more by the operator, the control unit 18 performs a reduction process on the object at a reduction speed corresponding to the operation distance of the dragging operation of the operator, and displays the object on the display unit 6.

That is, when the control unit 18 determines that the dragging operation of the operator has reached the predetermined operation distance, the control unit 18 gradually increases the speed at which the object is reduced in accordance with the operation distance by the dragging operation of the operator at and following this reached state, performs a reduction process on the object, and displays the object on the display unit 6.

Such operations of steps S15 and S17 will be described below in detail once more.

Immediately after the dragging operation of the operation object by the operator is started, the control unit 18 performs an object reduction process while gradually changing the reduction ratio in accordance with the operation distance of the dragging operation to a large reduction ratio. As a result, the object that is displayed on the display unit 6 is gradually (linearly) reduced in accordance with the operation distance of the dragging operation until the operation distance becomes the specific operation distance, and the object is displayed.

Next, when the control unit 18 detects that the operation distance of the dragging operation of the operator has become the specific operation distance or more, the control unit 18 sequentially changes the reduction ratio to a large reduction ratio at a speed corresponding to the operation distance at and following the operation distance. Then, the object is sequentially reduced so as to reach the sequentially changed reduction ratio, and is displayed on the display unit 6.

Specifically, while the operation distance of the dragging operation is 0 cm to 1 cm, the control unit 18 changes the reduction ratio so as to gradually become a large reduction ratio, for example, 1.0 times (0.9 times (0.8 times (0.7 times (0.6 times (0.5 times . . . , performs a reduction process on the object so as to reach the changed reduction ratio, and displays the object.

In comparison, when the operation distance of the dragging operation increases to more than 1.0 cm, the control unit 18 sequentially changes the reduction ratio at a speed corresponding to the operation distance, and sequentially performs a reduction process on the object so as to reach the changed reduction ratio.

For example, in the case that the operation distance of the dragging operation is 2.0 cm, when it is pre-specified that the reduction ratio is changed at double speed, the control unit 18, in a state in which the finger of the operator is stationary at the operation distance of 2.0 cm, sequentially changes the reduction ratio at a specified speed corresponding to the operation distance, for example, 0.09 times→0.04 times→0.02 times . . . , performs a reduction process on the object so as to reach the changed reduction ratio, and displays the object.

That is, until the operation distance of the dragging operation becomes a specific operation distance, the control unit 18 performs a reduction process on the object at a reduction ratio corresponding to the operation distance of the dragging operation. For this reason, when the operator makes the finger with which the dragging operation is performed to be stationary on the display unit 6 until the operation distance of the dragging operation becomes a specific operation distance, the control unit 18 stops the object reduction process (the control unit 18 does not perform an object reduction process while the finger of the operator is stationary) from when a reduction process is performed once on the object at the specific reduction ratio corresponding to the operation distance at the position at which the finger of the operator is stationary until the next dragging operation is performed.

In comparison, when the control unit 18 detects that the operation distance of the dragging operation of the operator becomes the specific operation distance or more, the control unit 18 changes the reduction ratio at a speed corresponding to the operation distance of the dragging operation in the manner described above. For this reason, even if the finger of the operator is stationary on the display unit 6, the control unit 18 sequentially changes the reduction ratio at a speed corresponding to the operation distance of the dragging operation, for example, 0.09 times→0.04 times→0.02 times . . . , and sequentially performs a reduction process on the object at this changed reduction ratio.

As a result, it is possible for the operator to obtain the object that is gradually reduced through the display unit 6 until the operation object is dragged up to the specific operation distance. Furthermore, it is possible for the operator to obtain an object on which the reduction process is performed at a reduction ratio that is changed at a speed corresponding to the operation distance of the dragging operation through the display unit 6 from when the operation object is dragged to a specific operation distance or more until the dragging operation is completed (until the finger is moved away from the display unit 6).

In other words, from when the operation object is dragged to a specific operation distance or more until the dragging operation is completed (the finger is moved away from the display unit 6), even if the finger with which the operator performs a dragging operation is made stationary, the control unit 18 sequentially changes the reduction ratio at a speed corresponding to the position at which the finger of the operator is stationary, and sequentially performs a reduction process on the object at the changed reduction ratio.

As a result, from when the operation distance of the dragging operation exceeds the specific operation distance, the reduction ratio rapidly increases in spite of the fact that the operation distance is short. The object displayed on the display unit 6 is rapidly reduced as shown in FIG. 3C, and is displayed on the display unit 6.

The "specific operation distance" has been described as being set to "1.0 cm" as an example. In addition, the "specific operation distance" may be set to the length of "2.0 cm" or the "specific operation distance" may be set to the length for the amount of "300 pixels". That is, it is sufficient that the "specific operation distance" is set as desired according to design or the like.

Next, when such a dragging operation is to be completed, the operator separates the finger that is performing the dragging operation from the display unit 6. The control unit 18 determines whether or not the dragging operation has been completed by determining the presence or absence of the separation of the finger of the operator from the display unit 6 in step S16 of the flowchart of FIG. 4. When the control unit 18 determines that the dragging operation has been completed, the processing of the flowchart of FIG. 4 is completed.

When the control unit 18 determines that the dragging operation is to be continued, the process returns to step S14. When the process returns to step S14, the control unit 18 repeatedly performs the following operation in which the object is expanded and displayed at the reduction ratio corresponding to the operation distance until the operation distance of the dragging operation becomes the specific operation distance in the manner described above, and after the operation distance of the dragging operation exceeds the specific operation distance, the object is expanded and displayed while changing the reduction ratio at a speed corresponding to the operation distance.

As described above, in the mobile phone of the present embodiment, when the object is to be reduced, the operator long presses the display unit 6, thereby causing the display unit 6 to display the operation object. Then, the operator drags the operation object so as to be pulled down in the downward direction.

Until the operation distance of this dragging operation becomes a pre-specified specific operation distance, the control unit 18 of the mobile phone performs a reduction process on the object at the reduction ratio corresponding to the operation distance, and displays the object.

Furthermore, when the operation distance of the dragging operation becomes the specific operation distance, the control unit 18 changes the reduction ratio at the speed corresponding to the operation distance by the dragging operation of the operator at and following the specific operation distance, performs a reduction process on the object so as to reach the changed reduction ratio, and displays the object on the display unit 6.

As a result, by simply gripping the housing of the mobile phone with one hand, pressing the display unit 6 with the thumb of the hand that grips the housing for a long time so as to display the operation object, and dragging the operation object in the upward direction with the thumb, it is possible to reduce the object displayed on the display unit 6.

Consequently, it is possible for the mobile phone to reduce the object with two simple operations, that is, the long press operation of the display unit 6 and the dragging operation of the operation object. Furthermore, since a reduction operation is possible with one hand for the mobile phone in the manner described above, the mobile phone has high ease of use.

Furthermore, when an object reduction process is to be performed, the mobile phone reduces the object at the reduction ratio corresponding to the operation distance until the operation distance of the dragging operation becomes a specific operation distance. When the operation distance of the dragging operation becomes the specific operation distance or more, the mobile phone changes the reduction ratio at the speed corresponding to the operation distance of the dragging operation of the operator at and following the specific operation distance, and reduces the object so as to become the changed reduction ratio. Consequently, after the operation distance of the dragging operation becomes the specific operation distance or more, the object reduction process is performed at a reduction ratio that is changed at a high speed, making it possible to change the reduction ratio of the object in a short time.

Process Corresponding to Continuous Expansion/Reduction Operations

Next, such expansion processes and reduction processes are continuously performed in response to a series of dragging operations. That is, if the flowchart of the expansion process of FIG. 2 and the flowchart of the reduction process of FIG. 4 are made to be a flowchart of a series of flow, the flowchart of FIG. 5 is formed.

Figure 5:
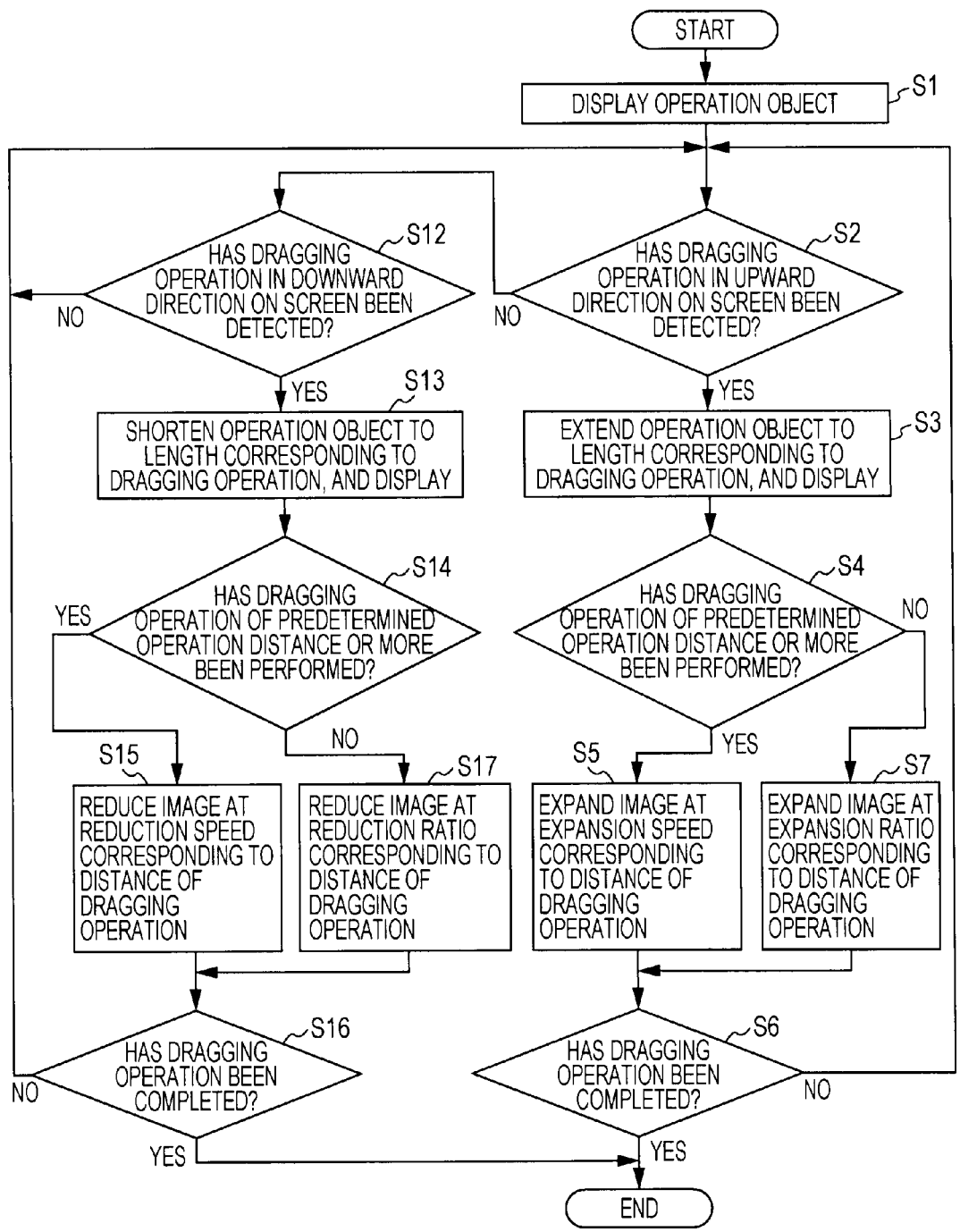
FIG. 5 is a flowchart illustrating the flow of continuous processes corresponding to the expansion operation and the reduction operation in the mobile phone according to the first embodiment.

As can be seen from the flowchart of FIG. 5, in steps S2 and S12, the control unit 18 of the mobile phone determines which one of the upward direction and the downward direction dragging operations have been performed while the operator causes his/her finger to touch the operation object of the display unit 6, drags the operation object, and moves the finger away from the display unit 6 (during the series of dragging operations). Then, when the control unit 18 detects the dragging operation in the upward direction, the control unit 18 performs an expansion process on the object in accordance with the expansion process routine of steps S2 to S7. When the control unit 18 detects the dragging operation in the downward direction, the control unit 18 performs a reduction process on the object in accordance with the reduction process routine of steps S12 to S17.

As a result, when the operator drags the operation object in the upward direction and drags the operation object in the downward direction in a continuous manner to the dragging operation in the upward direction without the finger being moved away from the display unit 6, the control unit 18 continuously expands and displays the object, and reduces and displays the object continuously to the expansion display.

Furthermore, when the upward dragging operation and the downward dragging operation are continuously repeated, the control unit 18 continuously expands and reduces the object and displays it in correspondence with the continuous upward and downward dragging operations.

Since such continuous expansion and reduction processes are possible for the mobile phone, it is possible for the operator to adjust the size of the object displayed on the display unit 6 while dragging the finger that is made to touch the display unit 6 in the up and down directions. Consequently, it is possible to quickly display an object of a desired size.

Effects of Expansion/Reduction Process

As described above, in the mobile phone of the first embodiment, by long pressing the display unit 6, the operation object is displayed on the display unit 6, and this operation object is dragged in the downward direction or in the upward direction.

Until the operation distance of the dragging operation becomes a pre-specified specific operation distance, the control unit 18 performs an expansion or reduction process on the object at an expansion ratio or at a reduction ratio corresponding to the operation distance.

Furthermore, when the operation distance of the dragging operation becomes the specific operation distance, the control unit 18 changes the expansion ratio or the reduction ratio at a speed corresponding to the operation distance by the dragging operation of the operator at and following the specific operation distance, performs an expansion process or a reduction process on the object so as to reach the changed expansion or reduction ratio, and displays the object on the display unit 6.

As a result, by simply gripping the housing of the mobile phone with one hand, pressing the display unit 6 with the thumb of the hand that grips the housing for a long time so as to display the operation object, and dragging the operation object in the upward direction or in the downward direction with the thumb, it is possible to expand or reduce the object displayed on the display unit 6.

Consequently, it is possible for the mobile phone to expand or reduce the object with two simple operations, that is, the long press operation of the display unit 6 and the dragging operation of the operation object. Furthermore, since an expansion operation or a reduction operation is possible with one hand for the mobile phone in the manner described above, the mobile phone has high ease of use.

Furthermore, when an object expansion process or an object reduction process is to be performed, the mobile phone expands or reduces the object at an expansion ratio or at a reduction ratio corresponding to the operation distance until the operation distance of the dragging operation becomes a specific operation distance. When the operation distance of the dragging operation becomes the specific operation distance or more, the mobile phone expands or reduces the object while changing the expansion ratio or the reduction ratio at a speed corresponding to the operation distance by the dragging operation of the operator at and following the specific operation distance. Consequently, after the operation distance of the dragging operation becomes the specific operation distance or more, it is possible to perform an expansion process or a reduction process on the object by changing the expansion ratio or the reduction ratio at a high speed, and it is possible to change the expansion ratio or the reduction ratio of the object in a short time.

Modification of Expansion/Reduction Operation

In the description of the above-described embodiment, by long pressing the display unit 6 so as to display the operation object and by dragging the operation object in the upward direction or in the downward direction, the expansion ratio or the reduction ratio of the object is changed. However, in an operation other than the dragging operation, the expansion ratio or the reduction ratio may be changed.

For example, the operator causes his/her thumb and index finger in a contact state to touch the touch panel. Then, while maintaining this state of being in contact with the touch panel, the operator gradually separates the thumb and the index finger in a contact state from each other. When the control unit 18 detects the operation (pinch operation) of gradually separating the thumb and the index finger from each other, the control unit 18 performs an expansion or reduction process on the object at an expansion ratio or at a reduction ratio corresponding to the operation distance until the operation distance (the distance between the thumb and the index finger) by the pinch operation becomes a specific operation distance.

Furthermore, when the operation distance by the pinch operation becomes the specific operation distance or more, the control unit 18 performs an expansion process or a reduction process on the object while changing the expansion ratio or the reduction ratio at a speed corresponding to the operation distance by the pinch operation of the operator at and following the specific operation distance. As a result, effects similar to those described above can be obtained.

Furthermore, in the description of the above-described embodiment, the display unit 6 is formed as what is called a touch panel. By performing a dragging operation or a pinch operation on the touch panel, the display magnification ratio of the object is changed. Alternatively, the display magnification ratio of the object may also be changed by operating a hardware key for an expansion operation or a hardware key for a reduction operation, which is provided in the housing of the mobile phone.

In this case, when any of the hardware keys is long pressed, the control unit 18 performs perform control to display the operation object on the display unit 6. When the hardware key for an expansion operation is pressed in a state in which the operation object is displayed on the display unit 6, the control unit 18 displays the operation object in a manner of a gradually extended period, as described with reference to FIG. 3B, in accordance with the pressing operation time period. The length of the operation object is a length corresponding to the pressing operation time period of the hardware key, and is a length equivalent to the operation distance of the dragging operation and the pinch operation.

Therefore, the control unit 18 detects the operation distance corresponding to each pressing operation time period of the hardware key by referring to, for example, a table indicating the relationship between the pressing operation time periods of the hardware keys and the operation distances. Until the detected operation distance becomes the specific operation distance, the control unit 18 performs an expansion or reduction process on the object at the expansion ratio or at the reduction ratio corresponding to the operation distance.

Furthermore, when the detected operation distance becomes the specific operation distance or more, the control unit 18 performs an expansion process or a reduction process on the object while changing the expansion ratio or the reduction ratio at a speed corresponding to the operation distance that is detected at and following the specific operation distance. As a result, effects similar to those described above can be obtained.

Center Position Setting Process During Expansion/Reduction Process

The mobile phone of the first embodiment changes the center position of the expansion process or the reduction process depending on whether or not a face image of a subject is included in the image or depending on the number of face images of subjects, which are included in the image, and performs the expansion process or the reduction process.

Figure 6:
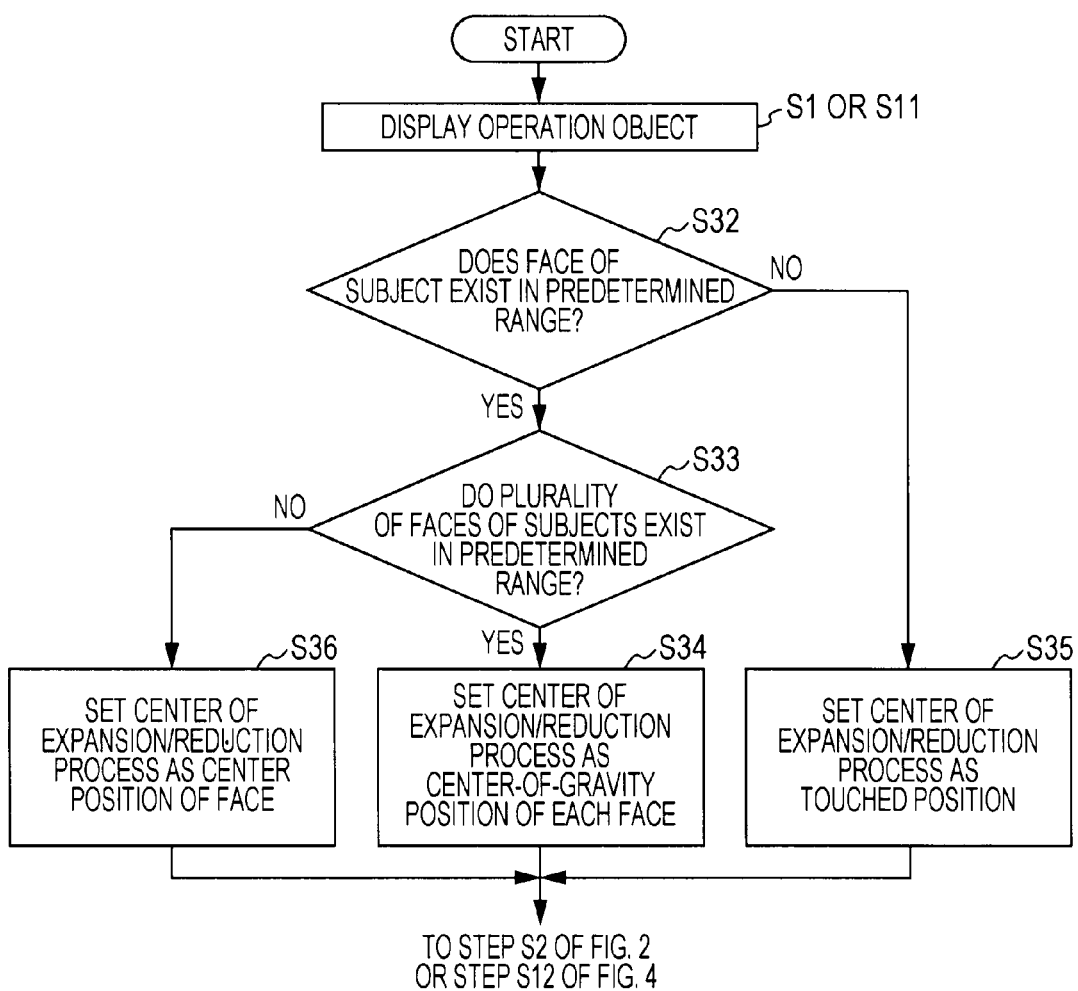
FIG. 6 is a flowchart illustrating an operation of setting a center position in the expansion/reduction process of the mobile phone according to the first embodiment.

When the center position of the expansion process or the reduction process is to be changed depending on the presence or absence of the face image of a subject or depending on the number of face images of subjects such as that described above, the control unit 18 performs each process of steps S32 to S36 of the flowchart of FIG. 6, between step S1 and step S2 of the flowchart of FIG. 2 or between step S11 and step S12 of the flowchart of FIG. 4.

That is, when the control unit 18 displays the operation object as a result of an arbitrary point of the display unit 6 being long-pressed, the process proceeds to step S32 of the flowchart of FIG. 6 in accordance with the display control program stored in the memory 17.

In step S32, in accordance with a predetermined face recognition program, the control unit 18 determines whether or not the face image of the subject is included in a range of a circle of a predetermined diameter, which includes the position at which the operator touches the display unit 6, within the image that are currently being displayed on the display unit 6. When the control unit 18 determines that the face image of the subject is included in the predetermined range, the process proceeds to step S33, and when the control unit 18 determines that the face image of the subject does not is included in the predetermined range, the process proceeds to step S35.

In this example, the control unit 18 determines whether or not the face image of the subject is included in a range of a circle of a predetermined diameter including the position at which the operator has touched the display unit 6. Alternatively, the control unit 18 may determine whether or not the face image of the subject is included in a range of a circle of a predetermined diameter, which does not include the position at which the operator has touched the display unit 6, the range being close to the touched position.

Furthermore, the range for which a determination is made as to the presence or absence of the existence of the face image of the subject is set to within a range of a circle of a predetermined diameter. In addition, this range may be a range of another shape, such as a rectangle or a triangle of a predetermined area.

Figure 7A:
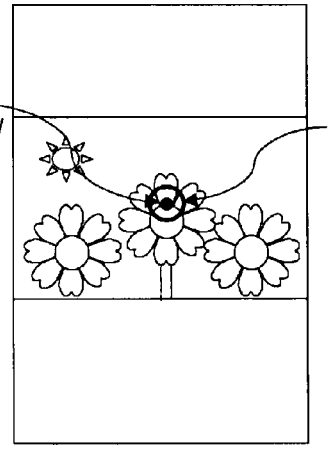
FIGS. 7A, 7B, 7C, and 7D are schematic views illustrating an operation of setting a center position in the expansion/reduction process of the mobile phone according to the first embodiment.

When the process proceeds to step S35 in response to determining that the face image of the subject is not included in the predetermined range of the image, as shown in, for example, FIG. 7A, the control unit 18 sets the position on the display unit 6, at which the operator has touched, as the center position used in the expansion process or the reduction process for the image. That is, in this case, the control unit 18 sets the position itself that the operator has touched as the center position of the expansion process or the reduction process.

Then, the process proceeds to step S2 of the flowchart of FIG. 2 or to step S12 of the flowchart of FIG. 4. The control unit 18 performs an expansion process or a reduction process on the image by using the set center position as the center.

On the other hand, when the process proceeds to step S35 in response to determining in step S32 that the face image of the subject is included in the image, the control unit 18 further determines whether or not a plurality of face images of subjects are included in the range of the circle of the predetermined diameter including the position of the image that the operator has touched. When the control unit 18 determines that a plurality of face images of subjects are included in the range of the circle of the predetermined diameter, the process proceeds to step S34. Furthermore, when the control unit 18 determines that a single face image of a subject is included in the range of the circle of the predetermined diameter, the process proceeds to step S36.

Figure 7B:
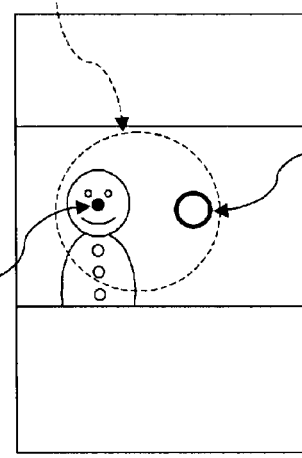

When the process proceeds to step S36 in response to determining that a single face image of the subject is included in the range of the circle of the predetermined diameter, the control unit 18 detects the center of the face of the subject that is included in the range of the circle of the predetermined diameter in accordance with a predetermined face recognition process program. Then, as shown in FIG. 7B, the control unit 18 sets the detected position of the center of the face of the subject as the center position of the expansion process or the reduction process for the image. After that, the process proceeds to step S2 of the flowchart of FIG. 2 or to step S12 of the flowchart of FIG. 4, and the control unit 18 performs the expansion process or the reduction process on the image by using the set center position as the center.

Figure 7C:
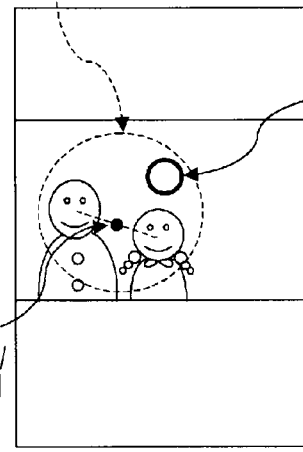

In comparison, when the process proceeds to step S34 in response to determining that a plurality of face images of subjects are included in the range of the circle of the predetermined diameter, the control unit 18 detects the center of the face of each subject that is included in the range of the circle of the predetermined diameter in accordance with the predetermined face recognition process program. Then, in a case where the number of face images of the subjects, which are included in the range of the circle of the predetermined diameter, is two, the control unit 18 sets the middle position of a straight line that connects the centers of the faces of the subjects as the center position of the expansion process or the reduction process for the image, as shown in FIG. 7C. After that, the process proceeds to step S2 of the flowchart of FIG. 2 or to step S12 of the flowchart of FIG. 4, and the control unit 18 performs an expansion process or a reduction process on the image by using the set center position as the center.

Figure 7D:
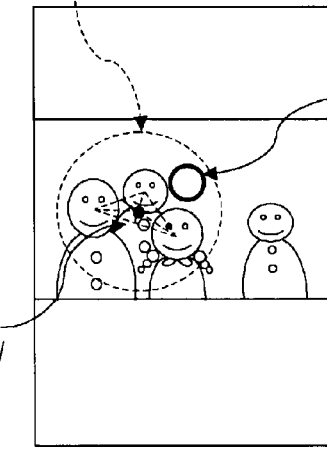

Furthermore, in a case where the number of face images of subjects, which are included in the range of the circle of the predetermined diameter, is three or more, as shown in FIG. 7D, the control unit 18 sets the position of the center of gravity of the polygons formed by connecting the centers of the faces of the subjects as the center position of the expansion process or the reduction process for the image. After that, when the process proceeds to step S2 of the flowchart of the FIG. 2 or to step S12 of the flowchart of FIG. 4, the control unit 18 performs an expansion process or a reduction process on the image by using the set center position as the center.

In the case of a system in which an expansion process or a reduction process is performed by using the position at which a touch operation is performed by the operator as the center point, if there is a variation between the position at which a touch operation is performed and the position desired as the center point of the expansion process or the reduction process, this variation increases as the expansion process or the reduction process of the image is performed, presenting the problem that the expansion process or the reduction process is not performed on the image with the desired center point being the center.

However, the center of the face of the subject or the center of gravity of the faces of the subjects, which are included in the range of the circle of the predetermined diameter, the circle being formed in such a manner as to correspond to the position at which the operator performs a touch operation, is set as the center point of the expansion process or the reduction process, and the expansion process or the reduction process is performed. Consequently, the center point can be set at a position that is highly probable to be desired by the operator as the center point of the expansion process or the reduction process, and the expansion process or the reduction process of the image can be performed.

Second Embodiment

Next, a description will be given of a mobile phone according to a second embodiment of the present disclosure.

In a case where a plurality of faces of subjects are included in a range of a circle of a predetermined diameter, the mobile phone of the second embodiment detects the priority of the face image of the subjects on the basis of a priority table in which face images of users, priorities and the like are registered in such a manner as to be associated with each other, and performs an image expansion process or an image reduction process by using the face image of the subject having the highest priority as the center.

Such a mobile phone of the second embodiment has stored, in the memory 17 of FIG. 1, a priority table in which face images of users, priorities, and the like are registered in such a manner as to be associated with each other, in addition to data, such as the telephone directory described in the first embodiment.

This priority table is newly provided separately from the telephone directory. Alternatively, an area for registering priorities may be provided in advance in the telephone directory, and priorities may be registered in such a manner as to be associated with each user information in the telephone directory. Furthermore, the set priority of each user may be edited as appropriate in the order of the priority desired by the operator.

Figure 8:
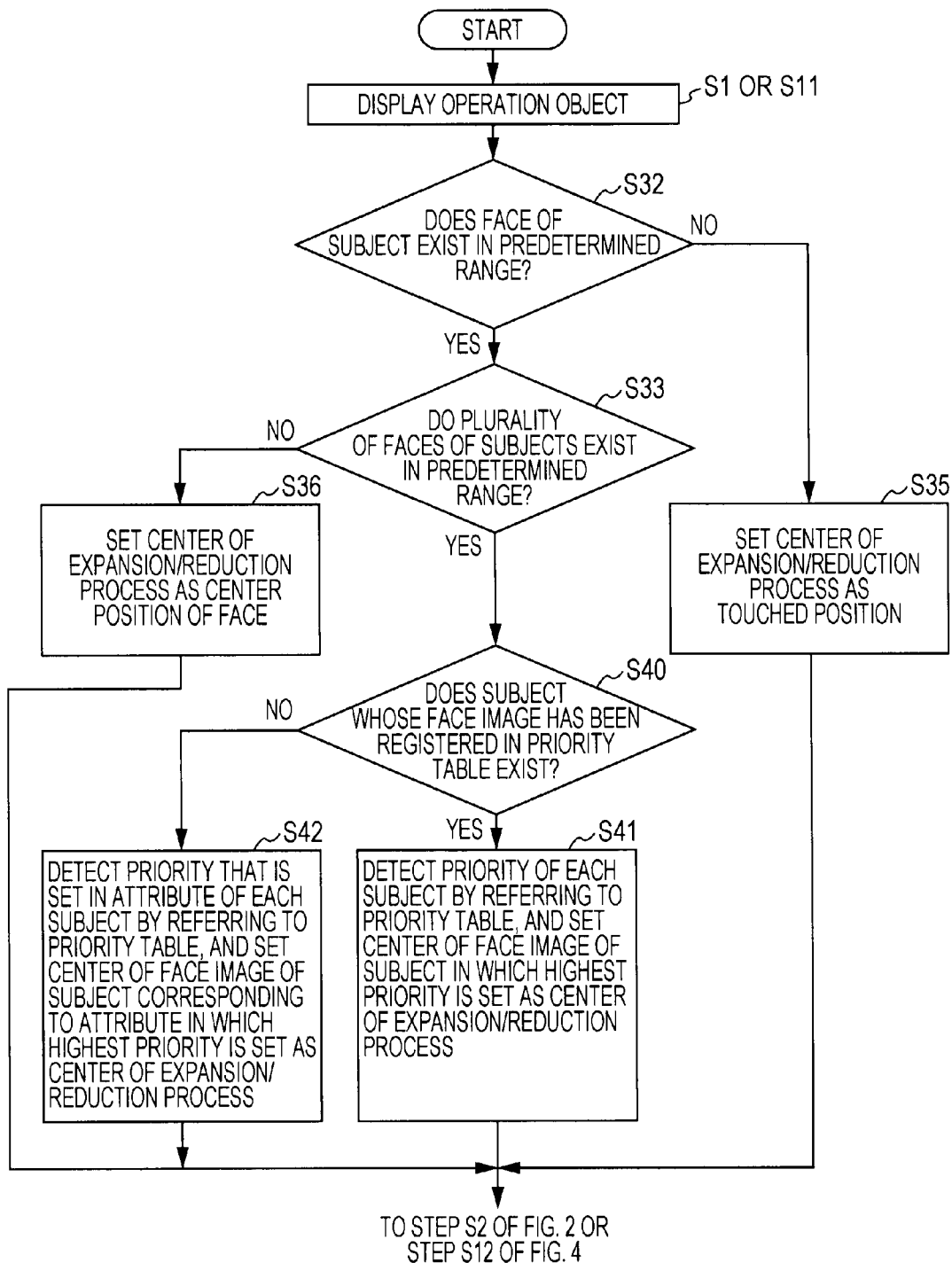
FIG. 8 is a flowchart illustrating an operation of setting a center position in the expansion/reduction process based on a priority in the mobile phone according to a second embodiment of the present disclosure.

Furthermore, such a mobile phone of the second embodiment performs each process of steps S40 to S42 shown in the flowchart of FIG. 8 in place of step S34 of the flowchart of FIG. 6.

That is, when the mobile phone of the second embodiment determines in step S33 of the flowchart of FIG. 8 that a plurality of faces of subjects are included in the range of the circle of the predetermined diameter, which includes the position touched by the operator or which is close to the position touched by the operator, the process proceeds to step S40 of the flowchart of FIG. 8.

In step S40, the control unit 18 recognizes the face of each subject in the range of the circle of the predetermined diameter in accordance with the face recognition process program. Furthermore, in the manner described above, the priority table of the memory 17 is registered with the face images of users, groups to which the users belong, priorities that are set to the users, and the like in such a manner as to be associated with the names of the users. In addition to the above, the priority table is registered with priorities that are set to the attributes (sex, age brackets, etc.) detected from the face image of the subject, and the like in such a manner as to be associated with the name of each user.

Therefore, in step S40, the control unit 18 checks the recognized face image of each subject in the range of the circle of the predetermined diameter against the face image of each user, which is registered in the priority table. Consequently, in step S40, the control unit 18 determines whether or not a subject whose face image has been registered in the priority table is included from among the subjects in the image. When the control unit 18 determines that a subject whose face image has been registered in the priority table is included, the process proceeds to step S41. When the control unit 18 determines that a subject whose face image has been registered in the priority table is not included, the process proceeds to step S42.

When the process proceeds to step S41 in response to determining that a subject whose face image has been registered in the priority table is included, the control unit 18 refers to the priority table, and detects the priority that has been set to the user whose face image has been registered. Then, the center of the face image of the subject corresponding to the user that has been set to the highest priority from among the detected priorities is set as the center of the expansion process/reduction process. After that, the process proceeds to step S2 of the flowchart of FIG. 2 or to step S12 of the flowchart of FIG. 4, and the control unit 18 performs the expansion process or the reduction process of the image by using the set center position as the center.

In comparison, when the process proceeds to step S42 in response to determining that the subject whose face image has been registered is not included, the control unit 18 detects the attribute of each subject in accordance with the face recognition process program, and detects the priority that has been set to this attribute by referring to the priority table. The center of the face image of the subject corresponding to the attribute in which the highest priority has been set from among the detected priorities is set as the center of the expansion process/reduction process. After that, the process proceeds to step S2 of the flowchart of FIG. 2 or to step S12 of the flowchart of FIG. 4, and the control unit 18 performs the image expansion process or the image reduction process by using the set center position as the center.

Such an operation of setting the center position on the basis of a priority will be described in detail.

FIG. 9 illustrates the relationship between reference items that are referred to when the control unit 18 determines the priority of each subject, and priorities. As can be seen from FIG. 9, in a case where a plurality of face images of subjects are included in the range of the circle of the predetermined diameter, the control unit 18 makes a determination as to whether the user is present among the face images that have been registered in the priority table. As shown in FIG. 9, the priority table is registered with, together with the name of each user, such as Mr./Ms. A or Mr./Ms. B, the group to which each user, such as, for example, a sweetheart, a friend, a family, or a company, belongs.

When the control unit 18 detects the face image corresponding to the face image of the subject from the priority table, the control unit 18 detects the priority that has been set to the face image. Although this is an example, in the case of the mobile phone of the present embodiment, the priority has been set to each user like a user having a first-place priority, a user having a second-place priority, a user having a third-place priority, and a user having a fourth-place priority among the users whose face images have been registered in the priority table.

The priority table is set with the group to which the user belongs in such a manner as to be associated with the name of the user. Therefore, it is also possible to set a priority to each group.

Figure 10:
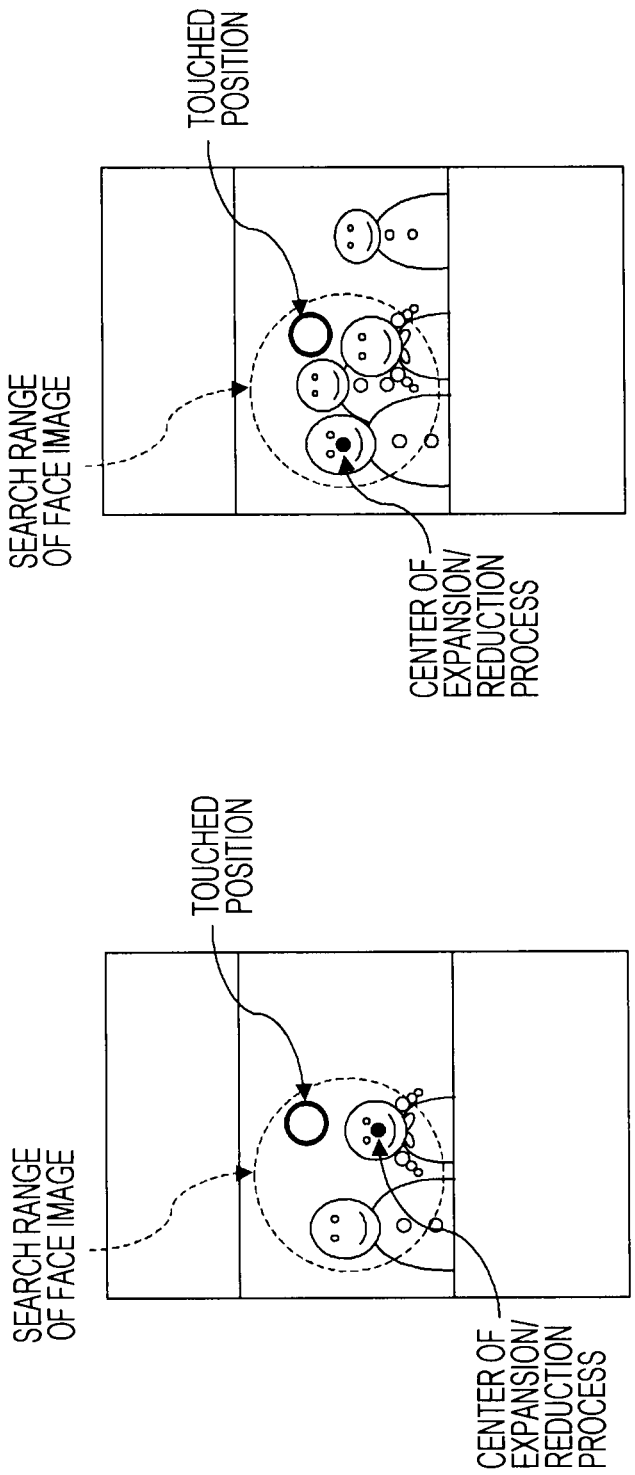
FIGS. 10A and 10B are schematic views illustrating the center position of the expansion/reduction process, which is determined on the basis of the priority in the mobile phone according to the second embodiment.

Consequently, in a case where the face image corresponding to the face image of the subject that is included in the range of the circle of the predetermined diameter has been registered in the priority table, the control unit 18 detects the priority that has been set to the face image, and sets the center of the face of the subject having the highest priority among the subjects as the center of the expansion process/reduction process, for example, as shown in FIG. 10A.

Furthermore, when the control unit 18 determines that the face image corresponding to the face image of the subject that is included in the range of the circle of the predetermined diameter has not been registered in the priority table, the control unit 18 detects the sex of each subject as a first attribute, and detects whether or not each subject is an adult or a child as a second attribute in accordance with the face recognition process program.

Although this is an example, in the case of the mobile phone of the present embodiment, the priority of a "male" of an "adult" among the subjects whose face images have not been registered in the priority table has been set to a fifth-place priority, the priority of a "female" of an "adult" has been set to a sixth-place priority, the priority of a "male" of a "child" has been set to a seventh-place priority, and the priority of a "female" of a "child" has been set to an eighth-place priority.

Consequently, in a case where the control unit 18 determines that the face image corresponding to the face image of the subject has not been registered in the priority table, the control unit 18 detects the sex of each subject and whether or not each subject is an adult or a child in accordance with the face recognition process program, determines the priority of each of the subjects in accordance with the preset priority, and sets the center of the face image of the subject having the highest priority from among the subjects as the center of the expansion process/reduction process, as shown in, for example, FIG. 10B.

As described above, the mobile phone of the present embodiment determines the priority on the basis of the presence or absence of the face image of the subject in the image on which an expansion process or a reduction process is to be performed, the presence or absence of the corresponding face image in the priority table, the attributes, such as the sex, adult/child, and the like, which are detected from the face image of the subject, and sets the center of the face image of the subject having the highest priority as the center of the expansion process or the reduction process.

Consequently, in addition to obtaining the same effects as those of the first embodiment, when an expansion operation or a reduction operation is to be performed on an image displayed on the display unit, it is possible to automatically set the center of the face image of the subject that is highly probable to be desired by the operator who operates the mobile phone from among the subjects that are included in the range of the circle of the predetermined diameter, as the center point of the expansion process or the reduction process, and it is possible to perform the expansion process or the reduction process. Also, it is possible to improve the ease of use of the expansion operation or the reduction operation through the automation of the setting of the center point of the expansion process or the reduction process such as that described above.

Even when the face image corresponding to the face image of the subject that is included in the range of the circle of the predetermined diameter of the image on which an expansion process or a reduction process is to be performed has not been registered in the priority table, the center of the face image of the subject in which the priority based on the attribute is highest can be automatically set as the center point of the expansion process or the reduction process, and the expansion process or the reduction process can be performed. Consequently, it is possible to improve the ease of use of the expansion operation or the reduction operation through the automation of the center point setting of the expansion process or the reduction process such as that described above.

In a case where a plurality of faces that are registered, for example, in the group of a "sweetheart", are included in the range of the circle of the predetermined diameter of the image on which an expansion process or a reduction process is to be performed, the center of all the faces may be set as the center of the expansion process or the reduction process, and the expansion process or the reduction process may be performed.

Similarly, in a case where the face image corresponding to the face image of the subject that is included in the range of the circle of the predetermined diameter of the image on which an expansion process or a reduction process is to be performed has not been registered in the priority table, and a plurality of face images of the subjects, which are determined to be at the same priority, are included, the center of all the faces may be set as the center of the expansion process or the reduction process, and the expansion process or the reduction process may be performed.

Third Embodiment

Next, a description will be given of a mobile phone according to a third embodiment of the present disclosure.

The mobile phone of the third embodiment is formed in such a manner that, in the mobile phone of the second embodiment, after the center of the expansion process or the reduction process based on the above-mentioned priority is set, when a leftward or rightward dragging operation is detected, another image of the subject, in which the center of the expansion process or the reduction process is set, is detected, and is displayed on the display unit 6.

In the mobile phone of the third embodiment such as that described above, as shown in the flowchart of FIG. 11, after the center of the expansion process or the reduction process is set, the processes of steps S51 to S53 are performed.

Figure 11:
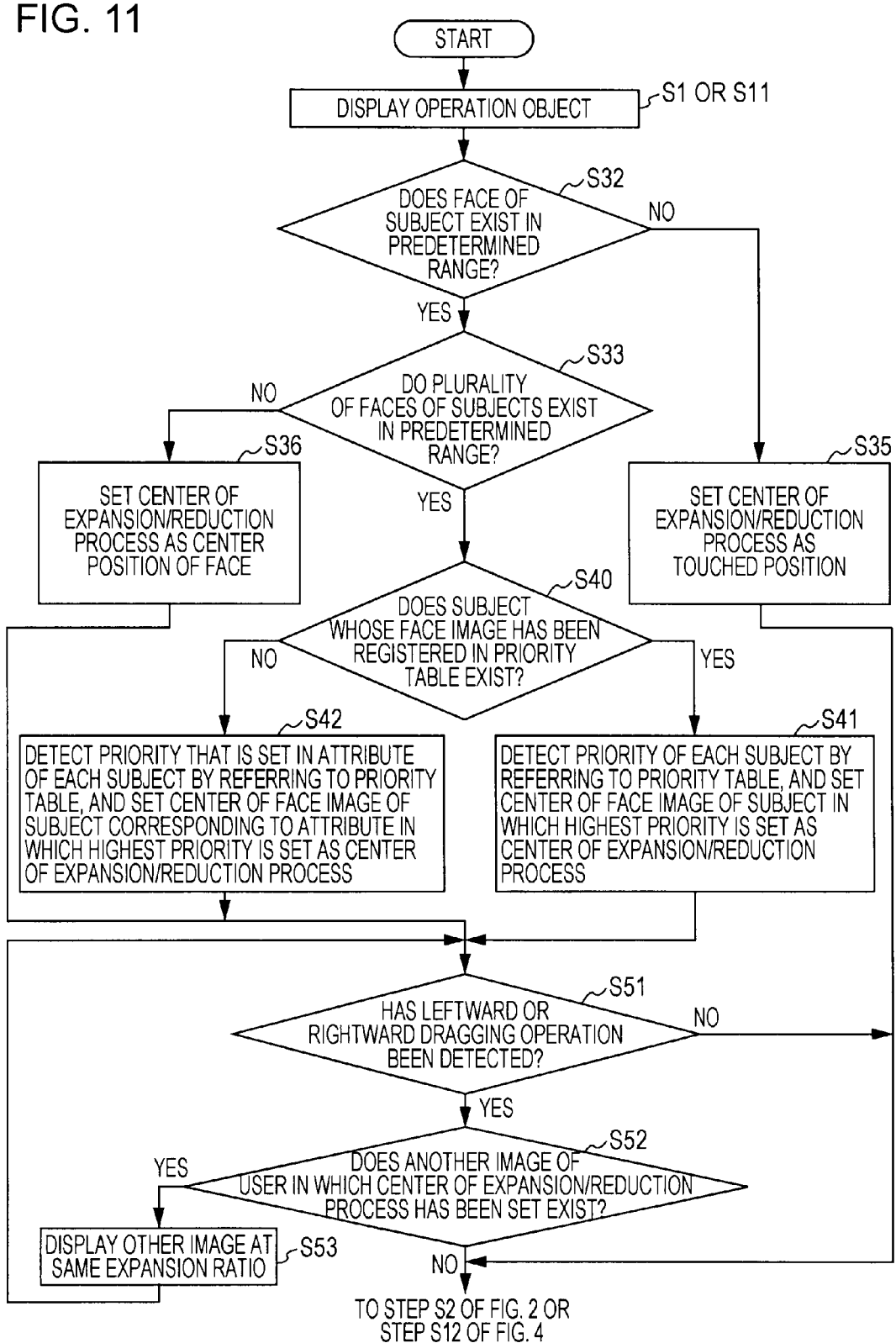
FIG. 11 is a flowchart illustrating an operation of changing an image on which an expansion/reduction process is performed according to a third embodiment of the present disclosure.

That is, when the control unit 18 of the mobile phone of the third embodiment sets the center of the expansion process or the reduction process in the manner described above, the process proceeds to step S51 of the flowchart of FIG. 11, whereby the control unit 18 determines whether or not the leftward or rightward dragging operation has been performed by monitoring the dragging operation on the display unit 6.

As described above, when the control unit 18 detects a dragging operation in the upward direction after the center of the expansion process or the reduction process is set, the control unit 18 performs an image expansion process. When the control unit 18 detects the dragging operation in the downward direction after the center of the expansion process or the reduction process is set, the control unit 18 performs an image reduction process.

In comparison, when the control unit 18 detects a dragging operation in a leftward or rightward direction after the center of the expansion process or the reduction process is set, the process proceeds to step S52 of the flowchart of FIG. 11, whereby the control unit 18 determines whether or not another image (another image of the same person) in which the same face image as the face image of the subject in which the center of the expansion process/reduction process is set has been stored in the memory 17 in the mobile phone or in an externally provided memory in accordance with the face recognition process program. When the control unit 18 determines that the other image of the same person is not included, the process proceeds to step S2 of FIG. 2 or to step S12 of FIG. 4, and waits for a dragging operation in the upward direction or in the downward direction, and the image expansion or reduction process is performed.

In comparison, when the control unit 18 detects another image of the same person from the memory 17 in the mobile phone or from an externally provided memory, the process proceeds to step S53. In step S53, the control unit 18 displays the other image of the same person, which is detected from the memory 17 or the like, in place of the image that has been displayed on the display unit 6 before the leftward or rightward dragging operation is detected. In this case, the control unit 18 displays the other image of the same person, which is detected from the memory 17 or the like, at the same expansion ratio as the expansion ratio of the image displayed on the display unit 6 before the leftward or rightward dragging operation is detected.

Each time the control unit 18 detects the leftward or rightward dragging operation, the control unit 18 sequentially displays another image of the same person detected from the memory 17 or the like.

Furthermore, the control unit 18 sets the center of the expansion process or the reduction process in the face of the subject of another image of the same person that is newly displayed, and performs an image expansion process or an image reduction process when the control unit 18 detects the dragging operation in the upward direction or in the downward direction.

In the case of the mobile phone of the third embodiment, the image on which an expansion process or a reduction process is to be performed can be easily changed to another image of the same person by only performing a leftward or rightward dragging operation. In addition, the same effects as those of the mobile phone of the second embodiment can be obtained.

Modification

The foregoing embodiments are examples in which the present disclosure is applied to a mobile phone. In addition to this mobile phone, the present disclosure can be applied to, for example, various electronic devices, such as a personal handyphone system (PHS) set, a personal digital assistant (PDA) device, a digital camera device, a digital video camera device, a notebook or desktop personal computer device, a television receiver, or a music player device. The same effects as those of the above-described embodiments can be obtained in any of the cases.

Furthermore, the operation object 20 is displayed on the display unit 6 formed as a touch panel, and by touching the operation object 20, an image expansion/reduction operation is performed. Alternatively, a hardware key may be provided in the housing, and the operation object 20 may be operated by operating the hardware key.

In this case, the control unit 18 detects the continuous operation time period of the hardware key, and controls the extension display of the operation object displayed on the display unit 6, and perform the above-mentioned expansion/reduction process in accordance with the length (the continuous operation time period of the hardware key) of the operation object. In this case, also, the same effects as those of the above-described embodiments can be obtained.

The above-described embodiments are examples of the present disclosure. Therefore, the present disclosure is not limited to the above-described embodiments. Various modifications are possible according to design desires or the like without departing from the technical concept of the present disclosure.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
a touch panel display configured to display an image and receive a touch input; and
circuitry configured to:
store first information associating identification information and a priority level for each of a plurality of registered persons;
detect a plurality of face images included in a range of one of a circle of a predetermined diameter, a rectangle or a triangle within the displayed image including a position corresponding to an initial touch input received at the touch panel display;
determine whether any of the plurality of face images corresponds to a registered person;
set a center point of one of the plurality of face images corresponding to a registered person having a highest priority level based on the stored first information as a center point for a magnification ratio change when it is determined that at least one of the plurality of face images corresponds to a registered person;
control the touch panel display to change a magnification ratio of the displayed image centered at the center point for the magnification ratio change based on a subsequent touch input received at the touch panel display;
receive a command to locate a second image of the registered person having the highest priority level;
locate the second image; and
control the touch panel display to display the second image at a magnification ratio equal to the changed magnification ratio.

2. The information processing apparatus of claim 1, wherein the circuitry is configured to control the touch panel display to display the image so that the center point for the magnification ratio change coincides with a center of the touch panel display.

3. The information processing apparatus of claim 1, wherein
the circuitry is configured to store second information associating attribute information and a priority level for each of a plurality of non-registered users.

4. The information processing apparatus of claim 3, wherein
the circuitry is configured to recognize an attribute corresponding to each of the plurality of face images when it is determined that none of the plurality of face images correspond to a registered person.

5. The information processing apparatus of claim 4, wherein
the circuitry is configured to set a center point of the one of the plurality of face images corresponding to attribute information having a highest priority level based on the second stored information as a center point for a magnification ratio change.

6. The information processing apparatus of claim 1, wherein
the circuitry is configured to perform the determining, setting and controlling while the initial touch input is continuously received at the touch panel display.

7. The information processing apparatus of claim 6, wherein
the subsequent touch input is a drag touch input that extends from the position corresponding to the initial touch input.

8. The information processing apparatus of claim 7, wherein
the circuitry is configured to control the touch panel display to increase the magnification ratio of the displayed image corresponding to a distance of the drag touch input when the distance is less than a predetermined threshold value.

9. The information processing apparatus of claim 7, wherein
the circuitry is configured to control the touch panel display to sequentially increase the magnification ratio of the displayed image at a speed corresponding to a distance of the drag touch input when the distance is greater than a predetermined threshold value.

10. An image display method comprising:
storing first information associating identification information and a priority level for each of a plurality of registered persons;
displaying an image at a touch panel display;
detecting a plurality of face images included in a range of one of a circle of a predetermined diameter, a rectangle or a triangle within the displayed image including a position corresponding to an initial touch input received at the touch panel display;
determining whether any of the plurality of face images corresponds to a registered person;
setting a center point of one of the plurality of face images corresponding to a registered person having a highest priority level based on the stored first information as a center point for a magnification ratio change when it is determined that at least one of the plurality of face images corresponds to a registered person;
controlling the touch panel display to change a magnification ratio of the displayed image centered at the center point for the magnification ratio change based on a subsequent touch input received at the touch panel display;
receiving a command to locate a second image of the registered person having the highest priority level;
locating the second image; and
controlling the touch panel display to display the second image at a magnification ratio equal to the changed magnification ratio.

11. The image display method of claim 10, further comprising:
displaying the image on the touch panel display so that the center point for the magnification ratio change coincides with a center of the touch panel display.

12. The image display method of claim 10, further comprising:
storing second information associating attribute information and a priority level for each of a plurality of non-registered persons.

13. The information display method of claim 12, further comprising:
recognizing an attribute corresponding to each of the plurality of face images when it is determined that none of the plurality face images correspond to a registered person.

14. The information display method of claim 13, further comprising:
setting a center point of one of the plurality of face images corresponding to attribute information having a highest priority level based on the second stored information as a center point for a magnification ratio change.

15. A non-transitory computer-readable medium including computer program instructions, which when executed by an information processing apparatus, cause the information processing apparatus to perform a method comprising:

storing first information associating identification information and a priority level for each of a plurality of registered persons;

displaying an image at a touch panel display;

detecting a plurality of face images included in a range of one of a circle of a predetermined diameter, a rectangle or a triangle within the displayed image including a position corresponding to an initial touch input received at the touch panel display;

determining whether any of the plurality of face images corresponds to a registered person;

setting a center point of one of the plurality of face images corresponding to a registered person having a highest priority level based on the stored first information as a center point for a magnification ratio change when it is determined that at least one of the plurality of face images corresponds to a registered person;

controlling the touch panel display to change a magnification ratio of the displayed image centered at the center point for the magnification ratio change based on a subsequent touch input received at the touch panel display;

receiving a command to locate a second image of the registered person having the highest priority level;

locating the second image; and controlling the touch panel display to display the second image at a magnification ratio equal to the changed magnification ratio.

16. The non-transitory computer-readable medium of claim 15, the method further comprising:

storing second information associating attribute information and a priority level for each of a plurality of non-registered persons.

17. The non-transitory computer-readable medium of claim 16, the method further comprising:

recognizing an attribute corresponding to each of the plurality of face images when it is determined that none of the plurality face images correspond to a registered person.

18. The non-transitory computer-readable medium of claim 17, the method further comprising:

setting a center point of one of the plurality of face images corresponding to attribute information having a highest priority level based on the second stored information as a center point for a magnification ratio change.

* * * * *